(12) United States Patent
Becker et al.

(10) Patent No.: US 7,720,492 B2
(45) Date of Patent: May 18, 2010

(54) METHOD AND MULTIMEDIA MESSAGE CENTER FOR DELIVERING A MULTIMEDIA MESSAGE TO A TELECOMMUNICATION DEVICE CONFIGURED AS A MULTIMEDIA MESSAGE SINK, AND TELECOMMUNICATION DEVICE FOR ACCESSING MULTIMEDIA MESSAGES STORED IN A STORAGE LOCATION OF A MULTIMEDIA MESSAGE SERVICE CENTER

(75) Inventors: Thomas Becker, Arnsberg (DE); Jan-Christoph Geiger, Bochum (DE); Werner Goertz, Dorsten (DE); Guido Heling, Dortmund (DE); Stefan Kruppa, Castrop-Rauxel (DE); Peter Mros, Castrop-Rauxel (DE); Stefan Nieder, Isselburg (DE); Albert Ratermann, Bocholt (DE); Stanislaus Willemsen, Dinxperlo (NL); Marco van de Logt, Goch (DE)

(73) Assignee: Siemens Aktiengesellschaft, Munich (DE)

( * ) Notice: Subject to any disclaimer, the term of this patent is extended or adjusted under 35 U.S.C. 154(b) by 754 days.

(21) Appl. No.: 10/537,692
(22) PCT Filed: Feb. 20, 2004
(86) PCT No.: PCT/EP2004/001697
§ 371 (c)(1), (2), (4) Date: Jun. 6, 2005
(87) PCT Pub. No.: WO2004/075523
PCT Pub. Date: Sep. 2, 2004

(65) Prior Publication Data
US 2006/0019637 A1   Jan. 26, 2006

(30) Foreign Application Priority Data
Feb. 20, 2003   (DE) .............................. 103 07 276

(51) Int. Cl.
H04W 4/00   (2009.01)

(52) U.S. Cl. ................. 455/466; 455/412.1; 455/452.2; 709/227
(58) Field of Classification Search ... 455/412.1–412.2, 455/450–452.2, 455, 466; 370/328, 329; 709/227
See application file for complete search history.

(56) References Cited

U.S. PATENT DOCUMENTS

| | | | | |
|---|---|---|---|---|
| 6,138,158 | A | * | 10/2000 | Boyle et al. ................. 709/225 |
| 2001/0053687 | A1 | * | 12/2001 | Sivula ......................... 455/412 |

FOREIGN PATENT DOCUMENTS

| | | |
|---|---|---|
| EP | 0 831 633 | 3/1998 |
| WO | WO 01/33782 | 5/2001 |
| WO | WO 2004/057851 | 7/2004 |

* cited by examiner

Primary Examiner—George Eng
Assistant Examiner—Marcos L Torres
(74) Attorney, Agent, or Firm—King & Spalding L.L.P.

(57) ABSTRACT

The present application discloses an apparatus, system and method for reducing the time required for transmitting a multimedia message from any sender to any addressee and thus generally cut the cost of the multimedia message service. A traffic channel connection is kept to a receiving telecommunication device, which is established by a multimedia message service center that has received a multimedia message designated by a transmitting telecommunication device for said receiving telecommunication device, for example, in order to transmit an information message to the receiving telecommunication device during an SMS session by means of which the multimedia message service center informs the receiving telecommunication device about the arrival of the multimedia message, established for at least the period of time it takes the receiving telecommunication device to evaluate the received information message and hold an MMS session for fetching the message content of the multimedia message designated for the receiving telecommunication device from the multimedia message service center.

28 Claims, 5 Drawing Sheets

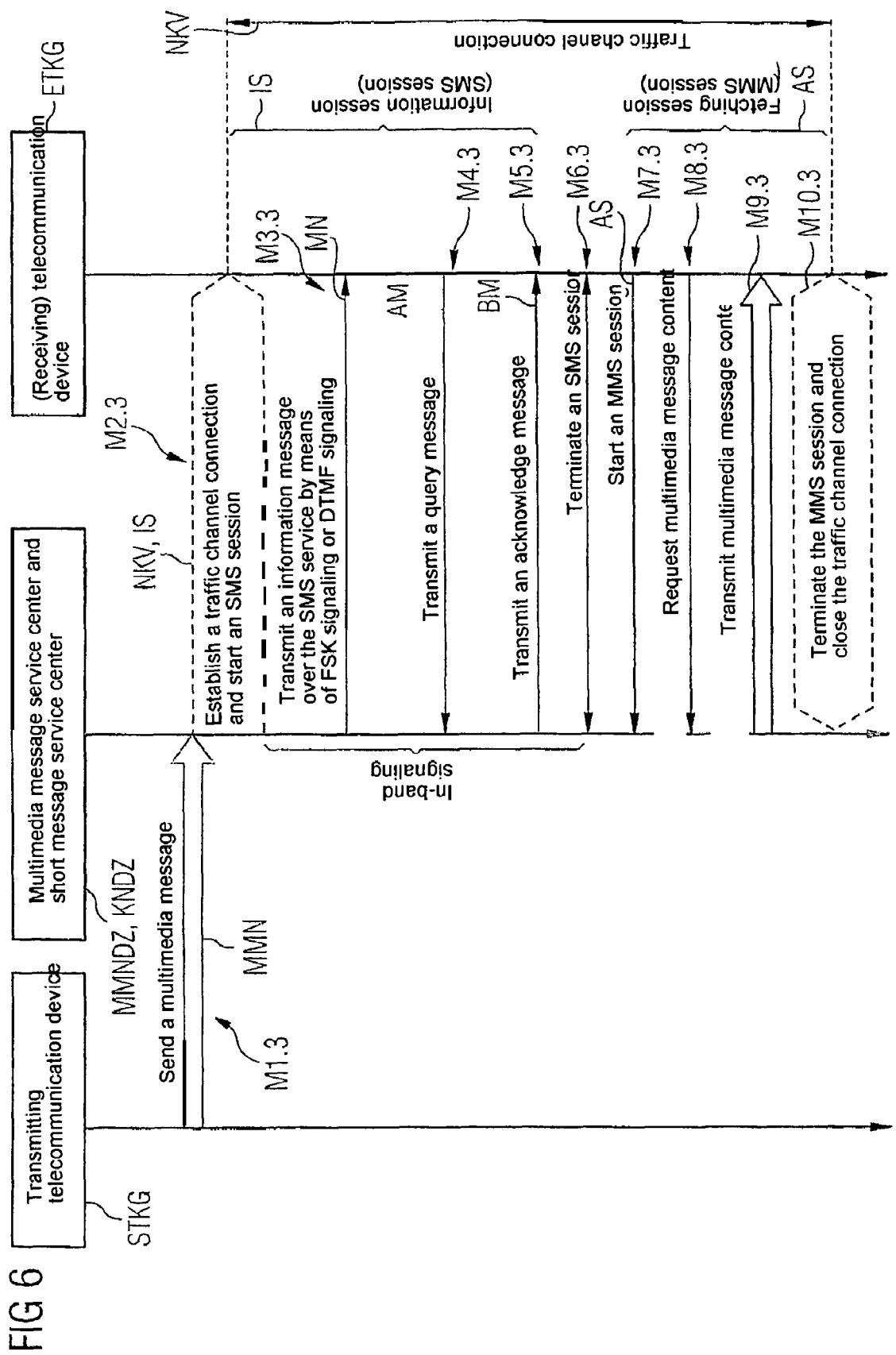

METHOD AND MULTIMEDIA MESSAGE CENTER FOR DELIVERING A MULTIMEDIA MESSAGE TO A TELECOMMUNICATION DEVICE CONFIGURED AS A MULTIMEDIA MESSAGE SINK, AND TELECOMMUNICATION DEVICE FOR ACCESSING MULTIMEDIA MESSAGES STORED IN A STORAGE LOCATION OF A MULTIMEDIA MESSAGE SERVICE CENTER

CROSS-REFERENCE TO RELATED APPLICATIONS

This application is a U.S. national stage application of International Application No. PCT/EP04/001697 filed Feb. 20, 2004, which designates the United States of America, and claims priority to German application number 103 07 276.4 filed Feb. 20, 2003, the contents of which are hereby incorporated by reference in their entirety.

FIELD OF THE INVENTION

The present disclosure relates to methods for delivering a multimedia message to a telecommunication device configured as a multimedia message sink. A multimedia message center is also disclosed for delivering a multimedia message to a telecommunication device configured as a multimedia message sink, and a telecommunication device for accessing multimedia messages stored in a storage location of a multimedia message service center.

BACKGROUND

The transmission and receipt of service messages sent to a telecommunication device such as a mobile telephone, a cordless telephone consisting of a base station and at least one mobile handset, a fixed network telephone, a fax machine, a personal computer etc., and vice versa from the telecommunication device, is a communication service distinguished by the information content transmitted with the messages, such as text, multimedia content such as audio and video data (call tones, screen savers), graphics, programs etc., and which, having first made its appearance on the mobile radio scene and finding widespread acceptance, is now gradually becoming established in the fixed network area. The plurality of services being offered in mobile radio communication networks—such as the short message (messaging) service (SMS), the enhanced message (messaging) service (EMS), the multimedia message (messaging) service (MMS), together with instant messaging, over the air activation (OTA), e-mail etc.—suggest that present developments both in the fixed networks and in the mobile radio field are heading toward a situation in which the SMS and MMS communication services in particular will play a greater role. In the case of SMS, standards already exist in both the mobile radio field and the fixed network field (for GSM: ETSI TS 100 942 V7.0.0, Release 1998; for ISDN/PSTN: ETSI ES 201 912V1.1.1, Release 01/2002) but the same is only true for MMS in the mobile radio field (cf.: 3GPP TS 22.140 V4.y.z; stage 1 and 2; Release 4), whereas in the fixed network field standardization activity is still taking place (cf.: ETSI DES/AT-030023V0. 1.0, 11/2003).

In fixed and mobile networks, SMS is a point-to-point service distinguished by an entirely push functionality—that is, the content of the short message (SM), which has a maximum length of 160 bytes, is sent by the short message service center (SMSC) to the telecommunication device and as a rule consists of text data, with the connection establishment procedure being initiated by the service center. Whereas SMS in the mobile radio field uses wireless transmission methods between the telecommunication device and the short message service center, the short message being transmitted without a traffic channel connection being established over a signaling channel, in fixed networks SMS is connection-oriented, a traffic channel connection being established between the telecommunication device and the short message service center, the short message then being transmitted over this connection by using frequency shift keying or dual tone multiple frequency and invoking the calling line identification (CLI) service feature known as calling line identification presentation (CLIP).

Whereas in mobile radio communication networks MMS is handled in the same way as SMS by wireless transmission over a WAP transport path (using the wireless application protocol), in fixed networks a different mechanism comes into effect. On transmitting a multimedia message (MM), which in principle is unlimited in size but is currently restricted to around 100 Kbytes, and can contain for example text, multimedia content such as audio and video data (call tones, screen savers), graphics, programs etc., and short data which may be text, audio and/or video, the telecommunication device is first sent a connection-oriented information message, known as the MMS notification, which informs the telecommunication device that there is a multimedia message at the multimedia message service center (MMSC). This notification is sent over a push service such as SMS. Unlike the receipt of a short message, however, in order to receive the content of a multimedia message it is necessary to initiate a further connection from the telecommunication device to the multimedia message service center.

FIGS. 1 and 2 show the transmission of multimedia messages MM in the fixed network from a sender (transmitting device) to an addressee (receiving device), in which the devices are both normally registered with one and the same multimedia message service center MMSC in accordance with the prior art.

In FIG. 1, the transmission of multimedia messages in the fixed network from a sender (transmitting device) to an addressee (receiving device) occur when both devices are registered with the same multimedia message service center, In FIG. 2, the transmission of multimedia messages in the fixed network from a sender (transmitting device) to an addressee (receiving device) occur when the two devices are registered with different multimedia message service centers.

FIG. 1 shows the transmission of a multimedia message MMN in a fixed network FN from a transmitting telecommunication device STKG to a receiving telecommunication device ETKG, in which both devices are registered with one and the same multimedia message service center MMNDZ which is assigned to the fixed network FN. In this context the term "assigned" means that the multimedia message service center MMNDZ is either part of the fixed network FN or is arranged outside of the fixed network FN. The transmitting telecommunication device STKG or the receiving telecommunication device ETKG is registered with the multimedia message service center MMNDZ by programming a receiving and transmitting number of the service center into the respective device. This is done either by a factory pre-configuration in the respective telecommunication device, or as a manual input by the user of the device, or by a special configuration message transmitted once-only, e.g. via the short message service, by the multimedia message service center MMNDZ to the transmitting telecommunication device STKG or receiving telecommunication device ETKG during the initial installation of the MMS service, and used to play back dynamically the data needed for installing said MMS service.

Transmission of the multimedia message MMN starts with the transmitting telecommunication device STKG transmitting the multimedia message MMN for the receiving telecommunication device ETKG over the fixed network FN to the multimedia message service center MMNDZ. In order to inform the receiving telecommunication device ETKG that the multimedia message MMN intended for the receiving telecommunication device ETKG has arrived in the multimedia message service center MMNDZ, the multimedia message service center MMNDZ sends an information message MN to a short message service center KNDZ which is assigned to the fixed network FN as the bearer of the information for the receiving telecommunication device ETKG and for the multimedia message service center MMNDZ. The short message service center KNDZ inserts the received information message MN into a short message KN and sends the short message KN together with the linked information message MN in a known way via the fixed network FN to the receiving telecommunication device ETKG. In this case, however, the receiving telecommunication device ETKG must be registered with the short message service center KNDZ. Registration with the short message service center KNDZ takes place in the same way as registration with the multimedia message service center MMNDZ.

Upon receiving the information message MN, the receiving telecommunication device ETKG establishes, via the fixed network FN, a temporary telecommunication link or a temporary Internet connection according to the transmission control protocol/internet protocol (TCP/IP) to the multimedia message service center MMNDZ with which it is registered as mentioned above, in order to retrieve the multimedia message MMN which is stored there.

The fact that the receiving telecommunication device ETKG, as mentioned above, is normally registered with only one multimedia message service center and one short message service center means that the connection for retrieving the multimedia message MMN can only be established with the multimedia message service center stored in the telecommunication device in each case.

However, the multimedia message itself need not necessarily always be stored on a data server (storage location) of the multimedia message service center with which the telecommunication device retrieving the multimedia message is registered, but may be located anywhere else on any data server, such as a data server of another multimedia message service center. This is always the case whenever the transmitting telecommunication device STKG sending the multimedia message MMN is registered with another multimedia message service center. This case is illustrated in FIG. 2.

FIG. 2 shows, similar to FIG. 1, the transmission of a multimedia message MMN in the fixed network FN from a transmitting telecommunication device STKG to a receiving telecommunication device ETKG, but in this case, unlike in FIG. 1, the two devices are registered with different multimedia message service centers MMNDZ, MMNDZ' both of which are assigned to the fixed network FN. Whereas the transmitting telecommunication device STKG is registered with the multimedia message service center MMNDZ, as in FIG. 1, the receiving telecommunication device ETKG is registered with a further multimedia message service center MMNDZ'.

In this context the term "assigned" means that the multimedia message service center MMNDZ, MMNDZ' is either part of the fixed network FN or is arranged outside of the fixed network FN. The transmitting telecommunication device STKG or the receiving telecommunication device ETKG is registered with the multimedia message service center MMNDZ or the further multimedia message service center MMNDZ' by programming a receiving and transmitting number of the service center into the respective device. This is done either by a factory pre-configuration in the respective telecommunication device, or as a manual input by the user of the device, or by a special configuration message transmitted once-only, e.g. via the short message service, by the multimedia message service center MMNDZ to the transmitting telecommunication device STKG, or by the further multimedia message service center MMNDZ' to the receiving telecommunication device ETKG, during the initial installation of the MMS service, and used to play back dynamically the data needed for installing said MMS service.

As before, transmission of the multimedia message MMN starts with the transmitting telecommunication device STKG transmitting the multimedia message MMN for the receiving telecommunication device ETKG over the fixed network FN to the multimedia message service center MMNDZ. However, the multimedia message service center MMNDZ detects that the addressed receiving telecommunication device ETKG is not registered with the said multimedia message service center, but with the further multimedia message service center MMNDZ'. It then sends an item of information INF with the associated multimedia message MMN to the further multimedia message service center MMNDZ'. Upon receiving this information and message, and in order to inform the receiving telecommunication device ETKG that the multimedia message service center MMNDZ' has received from the multimedia message service center MMNDZ the multimedia message MMN intended for the receiving telecommunication device ETKG, the said further multimedia message service center MMNDZ' then sends an information message MN to a short message service center KNDZ which is assigned to the fixed network FN as the bearer of the information for the receiving telecommunication device ETKG and for the two multimedia message service centers MMNDZ/MMNDZ'. Also as before, the short message service center KNDZ inserts the received information message MN into a short message KN and sends the short message KN together with the linked information message MN in a known way via the fixed network FN to the receiving telecommunication device ETKG which in this case too is registered with the short message service center KNDZ. Registration with the short message service center KNDZ takes place in the same way as registration with the further multimedia message service center MMNDZ'.

Upon receiving the information message MN, the receiving telecommunication device ETKG establishes, via the fixed network FN, a temporary telecommunication link or a temporary Internet connection according to the transmission control protocol/internet protocol (TCP/IP) to the further multimedia message service center MMNDZ' with which it is registered as mentioned above, in order to fetch the multimedia message MMN from where it has arrived and is stored pending retrieval.

The embodiments in FIG. 2 show that the two multimedia message service centers possess suitable mechanisms for transmitting the multimedia message from one service center to the other service center. Since as often as not the fixed network operators of such service centers are in a competitive situation or may even be located in different countries, there is frequently no corresponding bilateral agreement between the operators, so that it may not be possible to transmit the multimedia message in such a case.

In the mobile radio field this problem is dealt with by agreements between the individual operators of multimedia service centers.

In the short message service area, the competitive situation mentioned above is prevalent in the fixed network field in countries such as Germany. As a solution to the described problem, the numbers of a plurality of short message service centers are set up in the telecommunication devices, so that they can also receive short messages from non-registered short message service centers. Generally, however, receiving a short message does not present a problem, since the connection establishment procedure is always initiated by the delivering short message service center.

The embodiments in FIGS. 1 and 2 reveal a further problem in connection with the transmission of multimedia messages—implementation of the multimedia message service.

As already explained above, in the MMS service for transmitting the multimedia message from a sender to an addressee, in the first instance the addressee is sent an information message known as an MMS notification, which informs the addressee that there is a multimedia message at the multimedia message service center (MMSC). This notification is preferably sent over a push service such as SMS. Unlike the receipt of a short message in the SMS service, however, the content of the multimedia message still needs to be retrieved.

For this purpose, the addressee device establishes a connection to the multimedia message service center and retrieves the content of the multimedia message via this connection. If "immediate retrieval" is set up in the device, the connection establishment procedure takes place immediately after the connection established for transmitting the SMS message or the information message (NMS notification) has been terminated.

If retrieval of the multimedia message is intended to be free of charge, the multimedia message service center must provide suitable call numbers which allow the communication device to make a free call. This involves the multimedia message service center in additional costs for providing the access numbers concerned.

This problem, so far discussed against the background of the prior art (e.g. FIG. 1), is shown in FIG. 3. This shows the following:

FIG. 3: A sequence chart based on FIG. 1, showing the sequence of measures connected with the transmission of a multimedia message from a sender (transmitting device) to an addressee (receiving device) in the fixed network.

FIG. 3, based on FIG. 1, shows the sequence of measures M1.1 to M9.1 connected with the transmission of the multimedia message MMN from the transmitting telecommunication device STKG to the receiving telecommunication device ETKG in the fixed network FN. First the multimedia message MMN is transmitted by the transmitting telecommunication device STKG according to a first measure M1.1 to the multimedia message service center MMNDZ, where it is preferably buffered or stored until the time when the multimedia message is retrieved by the recipient (in this case, the receiving telecommunication device ETKG). According to a second measure M2.1 the multimedia message service center MMNDZ causes (initiates) transmission of the information message MN, known as the MMS notification, to the receiving telecommunication device ETKG, whereupon a push proxy gateway (PPG) (not shown) of the multimedia message service center MMNDZ transmits the information message MN to the short message service center KNDZ, also known as the short message service center SMSC.

In order to enable transmission of the information message MN to the receiving telecommunication device ETKG as instructed by the multimedia message service center MMNDZ, the short message service center KNDZ establishes according to a third measure M3.1 a circuit switched (and therefore chargeable) first traffic channel connection NKV1 to the receiving telecommunication device ETKG. According to a fourth measure M4.1, the information message MN "packaged" in the short message KN (using the SMS service) is then sent by means of the FSK or DTMF signaling originally mentioned, and typically at a transmission rate of 1200 baud, via this established connection (in-band signaling) to the receiving telecommunication device ETKG. If the information message MN is transmitted, then according to a fifth measure M5.1 the first traffic channel connection NKV1 is cleared. According to FIG. 3 this connection can be cleared down by both the receiving telecommunication device ETKG and the short message service center KNDZ.

According to a sixth measure M6.1, when the first traffic channel connection NKV1 has been cleared down the receiving telecommunication device ETKG establishes a second circuit switched (and therefore chargeable) traffic channel connection NKV2 to the multimedia message service center MMNDZ. According to a seventh measure M7.1, the receiving telecommunication device ETKG uses this second traffic channel connection NKV2 to request the content of the multimedia message MMN from the multimedia message service center MMNDZ. According to an eighth measure M8.1, the multimedia message service center MMNDZ then transmits the requested content to the receiving telecommunication device ETKG, possibly by means of a transmission control protocol/internet protocol (TCP/IP) session. When the content of the multimedia message MMN has been transmitted, then according to a ninth measure M9.1 the second traffic channel connection NKV2 is also cleared down. According to FIG. 3 this connection can be cleared down by both the receiving telecommunication device ETKG and the multimedia message service center MMNDZ.

BRIEF DESCRIPTION

Exemplary embodiment disclosed herein illustrate a method and a multimedia message center for delivering a multimedia message to a telecommunication device configured as a multimedia message sink, and a telecommunication device for accessing multimedia messages stored in a storage location of a multimedia message service center, so that the time required for transmitting the multimedia message from any sender to any addressee is shortened and thus the cost of the multimedia message service (MMS) can be generally reduced.

When a multimedia message from a sender is being delivered to a telecommunication device configured as a multimedia message sink (addressee device), the direct or indirect transmission of an information message, i.e. the MMS notification, by a multimedia message service center to an addressee device, and the retrieval of the content of the multimedia message by the addressee device from the multimedia message service center, take place during a traffic channel connection in two separate sessions between the addressee device and the service center.

A traffic channel connection to a receiving telecommunication device, established by a multimedia message service center which has, for example, received a multimedia message from a transmitting telecommunication device intended for the said receiving telecommunication device, and established for the purpose of transmitting an information message to the receiving telecommunication device during an SMS session (using the short message service) in order to inform the receiving telecommunication device about the arrival of the said multimedia message, remains established until the receiving telecommunication device has evaluated the received information message and has executed an MMS session to retrieve the content of the multimedia message intended for the receiving telecommunication device from the multimedia message service center.

In contrast to the prior art, it is no longer necessary to have two separate traffic channel connections in order to receive the content of the multimedia message, but only one connection initiated by the multimedia message service center.

This has the following advantages:

No necessity for the multimedia message service center to provide toll-free access numbers if access to the multimedia message service center is intended and required to be without charge.

Faster MMS handling, since the time needed for the telecommunication device to establish a traffic channel connection is saved.

A further time saving since authentication mechanisms are not needed.

Saving of an additional access number in the telecommunication device, if different call numbers are provided in the telecommunication device for transmitting and receiving a multimedia message.

Billing advantages for the operator of the multimedia message service center.

Further advantageous embodiments of the invention are specified in the individual sub-claims and in the description of the typical embodiment of said invention.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 6 illustrates a second sequence chart based on FIGS. 3 and 4, showing the sequence of measures connected with the transmission of a multimedia message from a sender (transmitting device) to an addressee (receiving device), the multimedia message service center and the short message service center forming a single service center.

DETAILED DESCRIPTION

Figure 1:
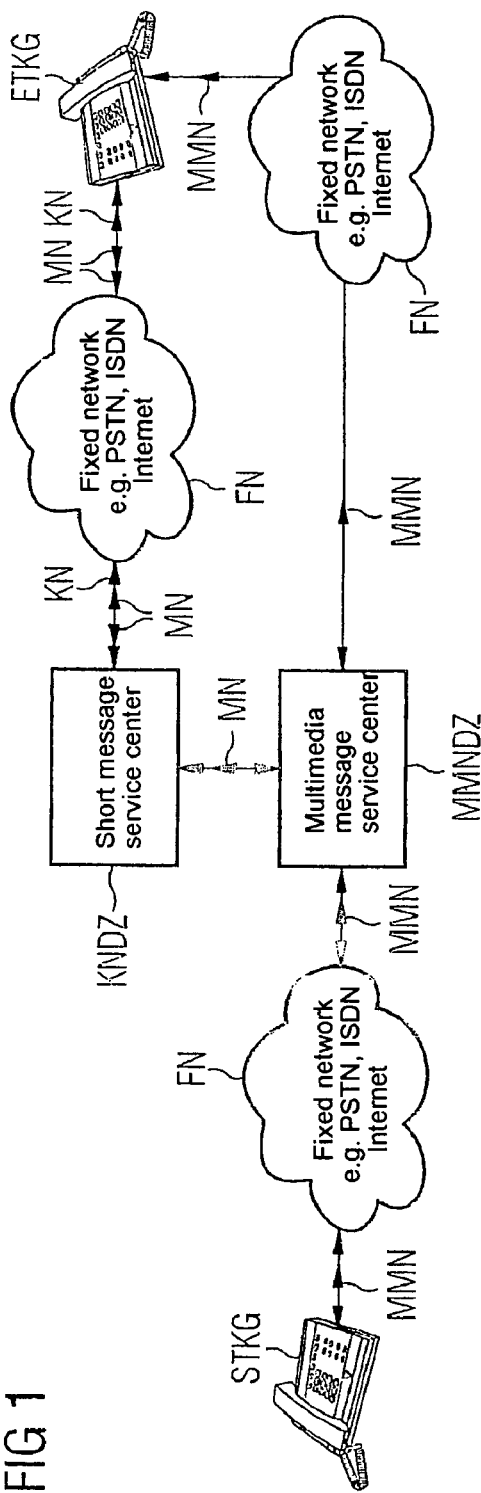
FIGS. 1 and 2 show the transmission of multimedia messages MM in the fixed network from a sender (transmitting device) to an addressee (receiving device), in which the devices are both normally registered with one and the same multimedia message service center MMSC in accordance with the prior art.
Figure 2:
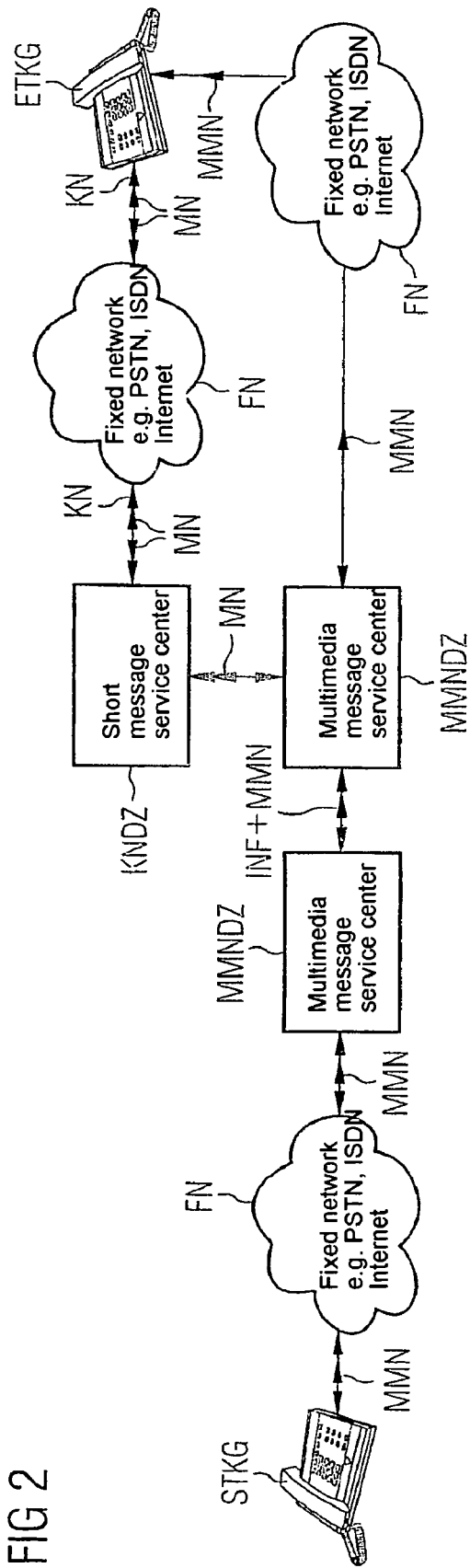
Figure 4:
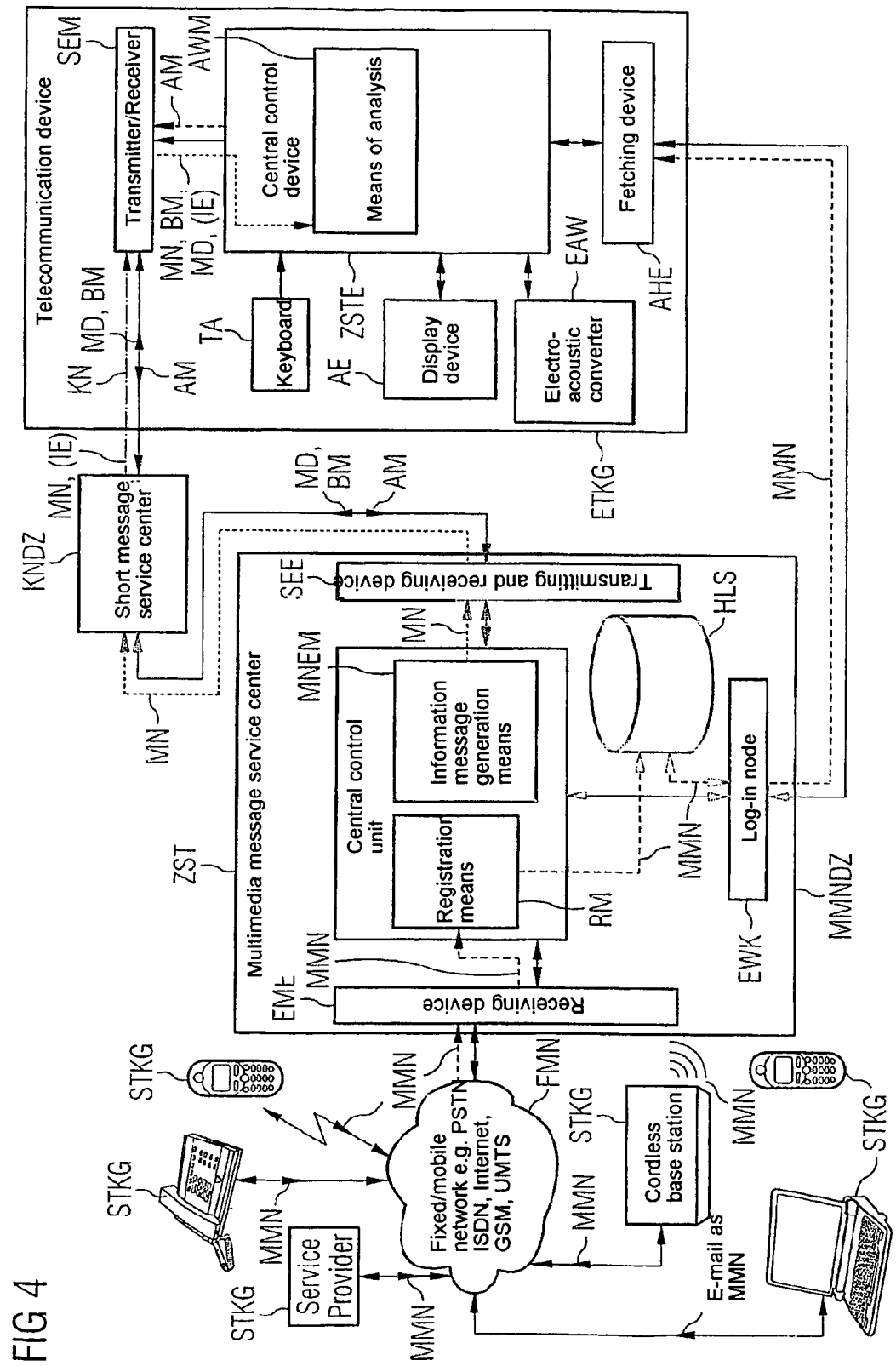
FIG. 4 illustrates the transmission of multimedia messages in the fixed/mobile network from a sender (transmitting device) to an addressee (receiving device), when both devices are registered either with the same multimedia message service center or with different multimedia message service centers, with the sole involvement of the retrieval multimedia message service center, the message storage location and the log-in node being arranged within the retrieval multimedia message service center.

FIG. 4 shows on the basis of FIGS. 1 and 2 the transmission of a multimedia message MMN in a fixed/mobile network FMN by a transmitting telecommunication device STKG to a receiving telecommunication device ETKG, the two devices being registered either with different multimedia message service centers MMNDZ, MMNDZ' or with one and the same multimedia message service center, e.g. the multimedia message service center MMNDZ or the further multimedia message service center MMNDZ'. The multimedia message service center or the multimedia message service centers are assigned to the fixed/mobile network FMN. Whereas the transmitting telecommunication device STKG, as in FIGS. 1 and 2, is registered with the multimedia message service center MMNDZ, the receiving telecommunication device ETKG can be registered with the further multimedia message service center MMNDZ' as in FIG. 2 or, according to the drawing in FIG. 4, can be registered with the multimedia message service center MMNDZ as in the case of the transmitting telecommunication device STKG.

In the context of the fixed/mobile network FMN, the term "assigned" means that the multimedia message service center MMNDZ is either part of the fixed/mobile network FMN or is arranged outside of the fixed/mobile network FMN. The transmitting telecommunication device STKG or the receiving telecommunication device ETKG is registered with the multimedia message service center MMNDZ by programming a receiving and transmitting number of the service center into the respective device. This is done either by a factory pre-configuration in the respective telecommunication device, or as a manual input by the user of the device, or by a special configuration message transmitted once-only, e.g. via the short message service, by the multimedia message service center MMNDZ to the transmitting telecommunication device STKG and to the receiving telecommunication device ETKG, during the initial installation of the MMS service, and used to play back dynamically the data needed for installing said MMS service.

The transmitting telecommunication device STKG can be configured differently, for instance as a fixed line telephone, a GSM/UMTS mobile telephone, a DECT cordless telephone consisting of a cordless base station and at least one cordless mobile handset, a portable personal computer (notebook) or a service provider. This list is not exclusive, and can be expanded as necessary to include any devices which are also able to transmit multimedia messages MMN over the fixed/mobile network FMN to the receiving telecommunication device ETKG (for example a fax machine). Moreover the form in which the multimedia message MMN is transmitted is not significant in the disclosed embodiment. For example, in addition to the known transmission forms, it is also possible for an e-mail to be sent as a multimedia message MMN.

Transmission of the multimedia message MMN starts with the transmitting telecommunication device STKG transmitting the multimedia message MMN for the receiving telecommunication device ETKG over the fixed/mobile network FMN to the multimedia message service center MMNDZ. The multimedia message service center MMNDZ has a receiving device EME for receiving the multimedia message MMN sent by the transmitting telecommunication device STKG. The receiving device EME forwards the received multimedia message MMN to a central control unit ZST of the multimedia message service center MMNDZ which controls the operating and function sequences in the multimedia message service center MMNDZ. This central control unit ZST preferably contains registration means RM, preferably in software form which register the forwarded multimedia message MMN and forward it for temporary buffering to a storage location HLS connected to the central control unit ZST and arranged within the multimedia message service center MMNDZ.

Along with the registration and storage of the multimedia message MMN, the receiving telecommunication device ETKG is informed by the central control unit ZST of the multimedia message service center MMNDZ that a multimedia message intended for the receiving telecommunication device ETKG is stored in the multimedia message service center MMNDZ pending retrieval. For this purpose, the central control unit ZST has not only the registration means RM but also means, likewise preferably in the form of software, for generating information messages MNEM. The information message generation means MNEM generate an information message MN, being the MMS notification introduced during the implementation of the MMS service in the fixed network, to inform the receiving telecommunication device ETKG about the existence of a multimedia message intended for the said receiving telecommunication device ETKG. For this purpose the information message MN is forwarded by the central control unit ZST to a transmitting and receiving device SEE in the multimedia message service center MMNDZ.

If both the receiving telecommunication device ETKG and the transmitting telecommunication device STKG are registered with the multimedia message service center MMNDZ as shown in FIG. 4, there is no problem regarding which multimedia message service center MMNDZ the receiving telecommunication device ETKG must log into in order to retrieve the content of the multimedia message MMN.

The situation is different, however, when the receiving telecommunication device ETKG and the transmitting telecommunication device STKG are registered with different multimedia message service centers as, for example, shown in FIG. 2. To be able to retrieve the content of the multimedia message in such a case, either the receiving telecommunication device ETKG must be informed where to log in, or the multimedia message service centers exchange information in order to make sure that the receiving telecommunication device ETKG receives the content of the multimedia message.

In the first case mentioned, the central control unit ZST of the multimedia message service center MMNDZ, shown in FIG. 4, has according to the International Patent Application (int. file number PCT/EP03/14639) means of generating log-in information with which to create an item of log-in information whereby the receiving telecommunication device ETKG is informed where it must log in so as to access and retrieve the stored multimedia message.

Having received the forwarded information message MN, the transmitting and receiving device SEE transmits the message to the receiving telecommunication device ETKG. Transmission may be direct from the multimedia message service center MMNDZ, or indirect, that is, with intermediate switching of at least one further instance. For the information message MN to be transmitted directly, an appropriate transmission protocol between the multimedia message service center MMNDZ and the receiving telecommunication device ETKG would need to be defined and specified, regardless of whether or not the receiving telecommunication device ETKG is registered with the multimedia message service center MMNDZ, so that the receiving telecommunication device ETKG can detect and interpret the transmitted message and information. As an alternative it is also possible to operate the further instance and the multimedia message service center MMNDZ as a single service center (cf. FIG. 6).

The situation is different for indirect transmission when, as a rule, a transmission service is called upon to transmit the information message MN. As already stated in the description of FIGS. 1 and 2, this involves the short message service or even the SMS with an SMS-specific transmission protocol. In the SMS service, transmission of the message and information needing to be transmitted to the telecommunication device is independent of whether the receiving telecommunication device ETKG is registered with the multimedia message service center MMNDZ, or not operated by a corresponding short message service center. However, other services can be envisaged for the same purpose.

As in FIGS. 1 and 2, the short message service is also used to transmit the information message MN shown in FIG. 4. The transmitting and receiving device SEE therefore sends the information message MN to a short message service center KNDZ which is assigned to the fixed/mobile network FMN as the bearer of the information for the receiving telecommunication device ETKG and for the multimedia message service center MMNDZ. The short message service center KNDZ inserts the received information message MN into a short message KN configured as a short message service message and sends the said short message KN together with the linked information message MN in a known way via the fixed/mobile network FMN to the receiving telecommunication device ETKG which is connected to the short message service center KNDZ and is registered with the short message service center KNDZ. Registration with the short message service center KNDZ takes place in the same way as registration of the receiving telecommunication device ETKG and the transmitting telecommunication device STKG with the multimedia message service center MMNDZ.

Instead of integrating the information message MN directly into the short message KN, it is also possible as an alternative to integrate the information message MN indirectly into the short message KN by first integrating it into a wireless application protocol push message and then integrating the wireless application protocol push message into the short message KN.

So that the information message MN can be received by the receiving telecommunication device ETKG, the latter has not only the conventional modules of such a telecommunication device (preferably operated as a telephone or cordless telephone) such as a keyboard TA, a display device AE and an electro-acoustic converter EAW, but also a transmitter/receiver SEM which is connected to a central control device ZSTE controlling the operating and function sequences in the receiving telecommunication device ETKG. For this purpose the central control device ZSTE is also connected to the keyboard TA, the display device AE and the electro-acoustic converter EAW. Lastly the information message MN accesses the central control device ZSTE via the connection to the transmitter/receiver SEM.

The central control device ZSTE contains means of analysis AWM, preferably in software form, for analyzing the received information message MN that has been forwarded to the central control device ZSTE. However, the said means of analysis AWM analyze not only the said information message MN, but other information also. In order to tell which information is analyzed in addition, FIGS. 5 and 6 will first be described at this point, before continuing with the description of FIG. 4.

Figure 3:
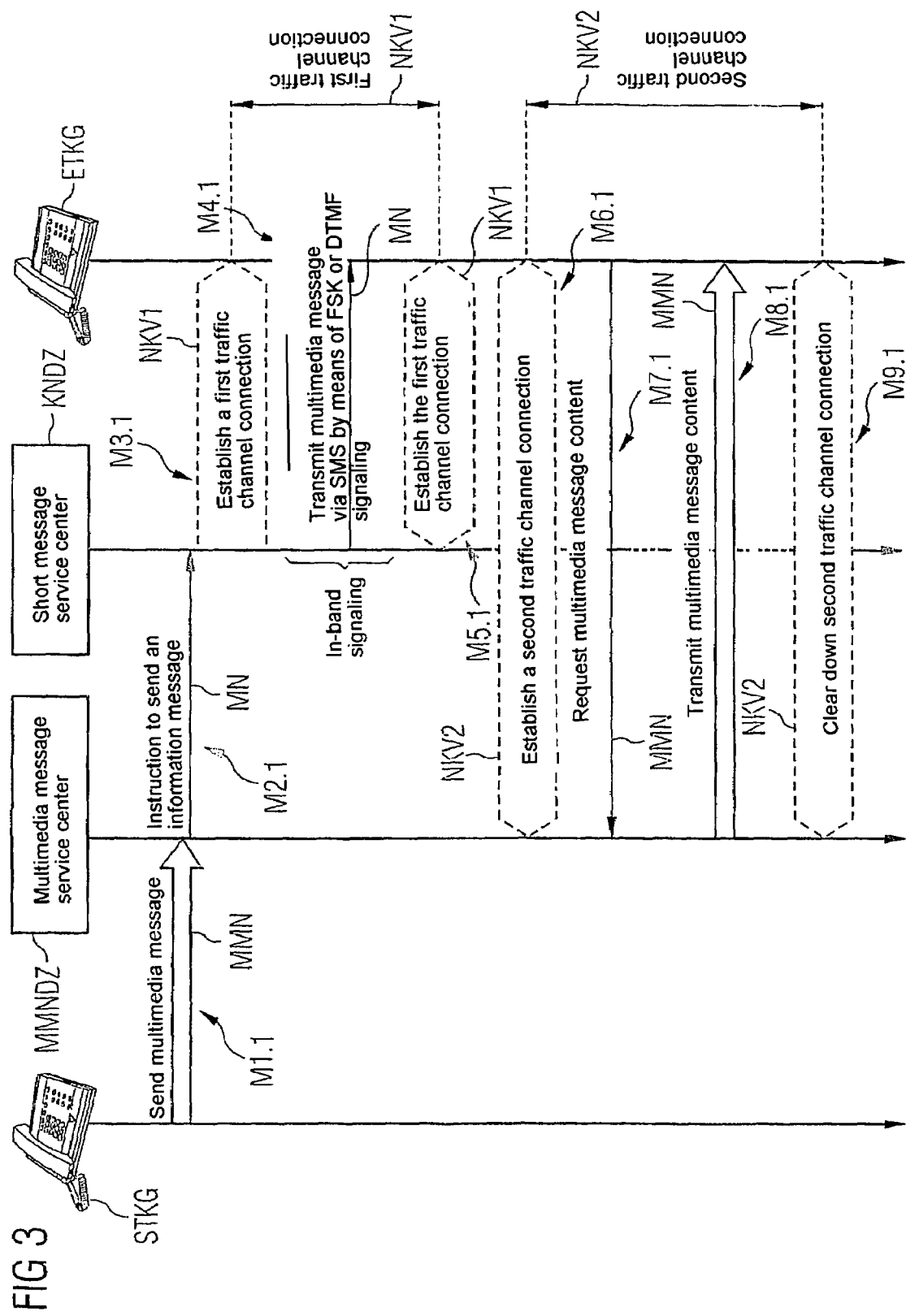
FIG. 3 illustrates a sequence chart based on FIG. 1, showing the sequence of measures connected with the transmission of a multimedia message from a sendor (transmitting device) to an address (receiving device) in the fixed network.
Figure 5:
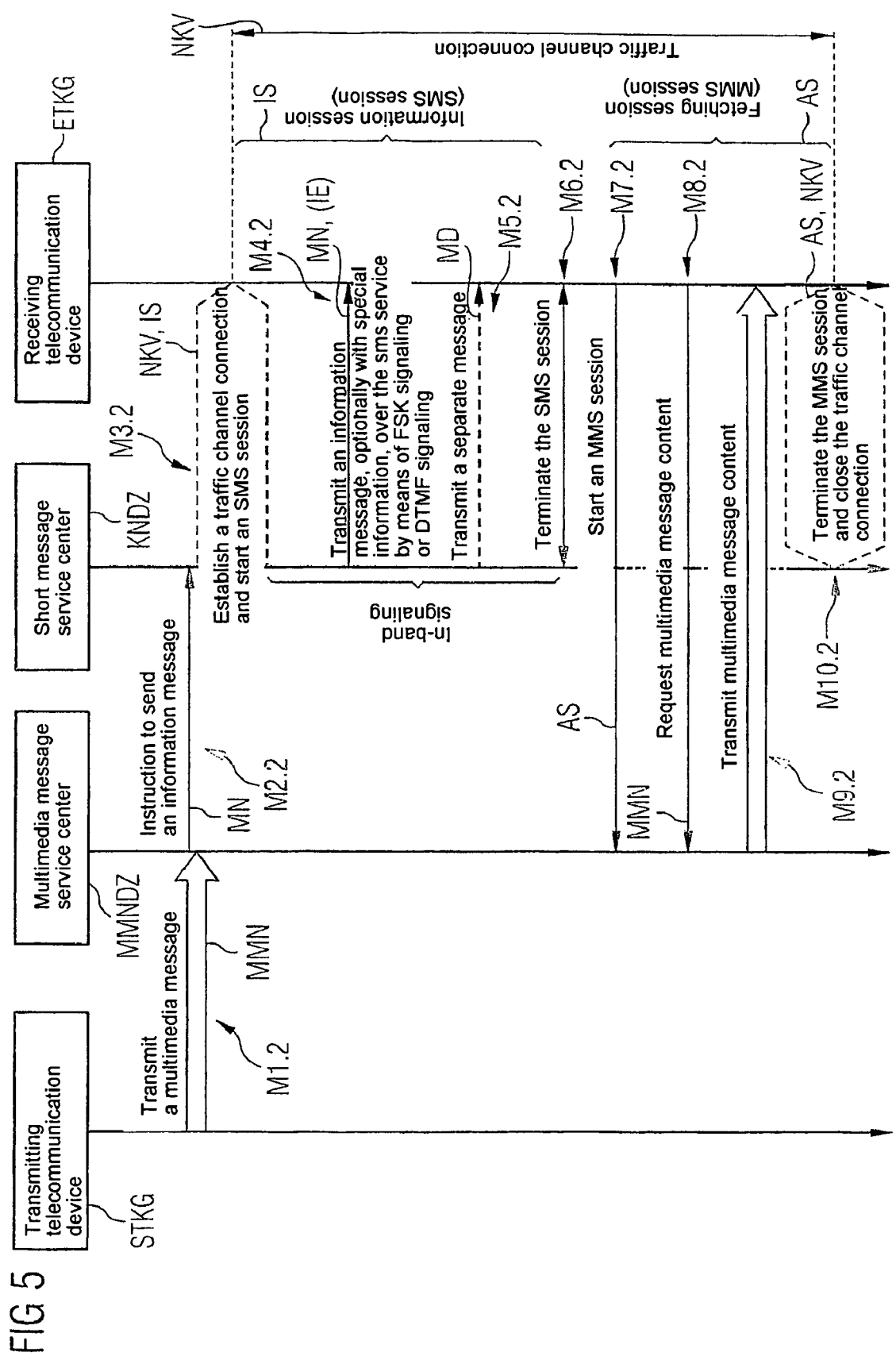
FIG. 5 illustrates a first sequence chart based on FIGS. 3 and 4, showing the sequence of measures connected with the transmission of a multimedia message from a sender (transmitting device) to an addressee (receiving device), the multimedia message service center and the short message service center being two separate service centers, possibly in different locations.

FIG. 5 shows on the basis of FIGS. 3 and 4 the sequence of measures M1.2 to M10.2 connected with the transmission of the multimedia message MMN from the transmitting telecommunication device STKG to the receiving telecommunication device ETKG in the fixed/mobile network FMN, the multimedia message service center MMNDZ and the short message service center KNDZ being two separate service centers, possibly in different locations. First the multimedia message MMN is transmitted by the transmitting telecommunication device STKG according to a first measure M1.2 to the multimedia message service center MMNDZ, where it is preferably buffered in the storage location HLS until the time when the multimedia message is retrieved by the recipient (in this case, the receiving telecommunication device ETKG). According to a second measure M2.2 the multimedia message service center MMNDZ causes (initiates) transmission of the information message MN, known as the MMS notification, to the receiving telecommunication device ETKG, whereupon a push proxy gateway (PPG) (not shown) of the multimedia message service center MMNDZ transmits the information message MN to the short message service center KNDZ, also known as the short message service center SMSC.

In order to enable transmission of the information message MN to the receiving telecommunication device ETKG as instructed by the multimedia message service center MMNDZ, the short message service center KNDZ establishes according to a third measure M3.2 a circuit switched (and therefore chargeable) traffic channel connection NKV to the receiving telecommunication device ETKG, and at the same time an information session IS is initiated, said session also being known as an SMS session due to the use of the SMS service for transmission of the information message. During this information session IS, according to a fourth measure M4.2, the information message MN "packaged" in the short message KN (using the SMS service) is then sent by means of the FSK or DTMF signaling originally mentioned, and typically at a transmission rate of 1200 baud, via this established connection (in-band signaling) to the receiving telecommunication device ETKG.

However, in order to inform the receiving telecommunication device ETKG that the short message service center KNDZ establishing the traffic channel connection NKV does not intend to clear down the established traffic channel connection NKV immediately after transmission of the information message, but preferably only after a delay, an information element IE of an information element container used for transmitting the information message is transmitted to the receiving telecommunication device ETKG together with the information message MN.

Such signaling can take place because a user data header information element (UDH-IE) contains either the information "LineTime", which specifies for how long the connection will be held open, or the information "UseSameLink", by which the receiving telecommunication device ETKG is requested to establish a new session.

This further information to the receiving telecommunication device ETKG also has the advantage that if the receiving telecommunication device ETKG does not want to initiate a new session at a particular moment or for the allotted duration, it is able to end the established traffic channel connection immediately and free up channel resources in the fixed/mobile network FMN.

As an alternative to transmitting the information element IE with the information message MN it is also possible, according to a fifth measure M5.2, to transmit to the receiving telecommunication device ETKG a separate message MD which fulfills the same purpose and which is either likewise packed in the short message KN or may itself actually be a dedicated short message. This message may take the following form:

When the short message service center KNDZ requests the receiving telecommunication device ETKG to clear down the traffic channel connection NKV after transmitting the information message (by sending a "Release"), then instead of sending this "Release" message, the short message service center KNDZ can send a message which is yet to be defined, "Release, hold Line" or "Establish-Link", as the specified message MD.

When the information message MN and the information element IE or the message MD have been transmitted, then according to a sixth measure M6.2 the information session IS is terminated. According to FIG. 5 this information session IS can be terminated by both the receiving telecommunication device ETKG and the short message service center KNDZ.

According to a seventh measure M7.2, on the basis of the previously described supplementary signaling via the short message service center KNDZ, following the close of the information session IS the receiving telecommunication device ETKG starts a fetching session AS to retrieve the content of the multimedia message MMN, said session also being known as an MMS session. In the context of this fetching session AS, according to an eighth measure M8.2, the receiving telecommunication device ETKG requests the content of the multimedia message MMN from the multimedia message service center MMNDZ. At this point it should be noted that there exists between the multimedia message service center MMNDZ and the short message service center KNDZ a physical "backbone connection" via which the receiving telecommunication device ETKG can retrieve the content of the multimedia message MMN. According to a ninth measure M9.2, the multimedia message service center MMNDZ then, depending on the type of receiving telecommunication device ETKG involved (e.g. fixed line analog/digital telephone, analog/digital cordless telephone, mobile telephone, personal computer, fax machine etc.), transmits the requested content according to a transmission control protocol/internet protocol (TCP/IP), a modem protocol, a peer-to-peer protocol (PPP), a fax protocol or a wireless session protocol (WSP) to the receiving telecommunication device ETKG. According to a tenth measure M10.2, once the content of the multimedia message MMN has been transmitted the fetching session AS is terminated and the traffic channel connection NKV to the short message service center KNDZ is also released. According to FIG. 5 both of these connections can be cleared down both by the receiving telecommunication device ETKG and by the multimedia message service center MMNDZ via the "backbone connection" or the short message service center KNDZ.

FIG. 6 shows on the basis of FIGS. 3 and 4 the sequence of measures M1.3 to M10.3 connected with the transmission of the multimedia message MMN from the transmitting telecommunication device STKG to the receiving telecommunication device ETKG in the fixed/mobile network FMN, the multimedia message service center MMNDZ and the short message service center KNDZ forming a single service center. First the multimedia message MMN is transmitted by the transmitting telecommunication device STKG according to a first measure M1.3 to the multimedia message service center MMNDZ, where it is preferably buffered in the storage location HLS until the time when the multimedia message is retrieved by the recipient (in this case, the receiving telecommunication device ETKG).

To enable transmission of the information message MN by the multimedia message service center MMNDZ/short message service center KNDZ to the receiving telecommunication device ETKG, the multimedia message service center MMNDZ/short message service center KNDZ establishes according to a second measure M2.3 a circuit switched (and therefore chargeable) traffic channel connection NKV to the receiving telecommunication device ETKG, and at the same time an information session IS is initiated, said session also being known as an SMS session due to the use of the SMS service for transmitting the information message. During this information session IS, according to a third measure M3.3, the information message MN "packaged" in the short message KN (using the SMS service) is then sent by means of the FSK or DTMF signaling originally mentioned, and typically at a transmission rate of 1200 baud, via this established connection (in-band signaling) to the receiving telecommunication device ETKG.

Under an alternate embodiment to that shown in FIG. 5, the receiving telecommunication device ETKG is not now informed by the multimedia message service center MMNDZ/short message service center KNDZ that the multimedia message service center MMNDZ/short message service center KNDZ establishing the traffic channel connection NKV does not intend to keep the established traffic channel connection NKV open for a certain time after transmission of the information message. To prevent the traffic channel connection NKV from being cleared down, as is the case with the first traffic channel connection in FIG. 3, the receiving telecommunication device ETKG in the alternate embodiment must be active in its own right.

According to a fourth measure M4.3 a query message AM is transmitted to the multimedia message service center MMNDZ/short message service center KNDZ asking whether the established traffic channel connection NKV can remain open until the content of the multimedia message MMN is retrieved from the multimedia message service center MMNDZ/short message service center KNDZ. For this purpose the query message AM can preferably either be packed in a separate short message just like the information message, or can itself be a dedicated short message.

According to a fifth measure M5.3, if this query message AM is answered by an acknowledge message BM from the multimedia message service center MMNDZ/short message service center KNDZ, then the intention is the same as that of the receiving telecommunication device ETKG, not to clear down the traffic channel connection NKV. For this purpose also the acknowledge message BM can preferably either be packed in a separate short message just like the information message, or can itself be a dedicated short message.

When the receiving telecommunication device ETKG has received the acknowledge message BM from the multimedia message service center MMNDZ/short message service center KNDZ, then according to a sixth measure M6.3 the information session IS is closed. According to FIG. 5 the information session IS can be terminated both by the receiving telecommunication device ETKG and by the multimedia message service center MMNDZ/short message service center KNDZ.

According to a seventh measure M7.3, and on the basis of the previously described exchange of messages, following the close of the information session IS the receiving telecommunication device ETKG starts a fetching session AS to retrieve the content of the multimedia message MMN, the session also being known as an MMS session. In the context of this fetching session AS, according to an eighth measure M8.3, the receiving telecommunication device ETKG requests the content of the multimedia message MMN from the multimedia message service center MMNDZ/short message service center KNDZ. According to a ninth measure M9.3, the multimedia message service center MMNDZ/short message service center KNDZ then, depending on the type of receiving telecommunication device ETKG involved (e.g. fixed line analog/digital telephone, analog/digital cordless telephone, mobile telephone, personal computer, fax machine etc.), transmits the requested content according to a transmission control protocol/internet protocol (TCP/IP), a modem protocol, a peer-to-peer protocol (PPP), a fax protocol or a wireless session protocol (WSP) to the receiving telecommunication device ETKG. According to a tenth measure M10.3, once the content of the multimedia message MMN has been transmitted, the fetching session AS is terminated and the traffic channel connection NKV to the multimedia message service center MMNDZ/short message service center KNDZ is also released. According to FIG. 6 both of these can be cleared down both by the receiving telecommunication device ETKG and by the multimedia message service center MMNDZ/short message service center KNDZ.

It should be noted that the multimedia message service center MMNDZ/short message service center KNDZ in FIG. 6 can also appear in place of the multimedia message service center MMNDZ and the short message service center KNDZ in FIG. 5 and vice versa.

The means of analysis AWM in FIG. 4 therefore analyze the information element IE, the message MD and the acknowledge message BM, all of which are conveyed over the transmitter/receiver SEM of the central control device ZSTE. For retrieving the content of the multimedia message MMN in the context of the fetching session AS according to FIGS. 5 and 6, the receiving telecommunication device ETKG has a fetching device AHE for retrieving messages and/or information; said device is connected on the one hand to the central control device ZSTE and on the other hand, for the temporary connection according to the transmission control protocol/internet protocol (TCP/IP), the modem protocol, the peer-to-peer protocol (PPP), the fax protocol and/or the wireless session protocol (WSP), to a log-in node EWK of the multimedia message service center MMNDZ, so that the central control device ZSTE can access the multimedia message service center MMNDZ via the fetching device AHE and retrieve the multimedia message.

As before, the log-in node EWK of the multimedia message service center MMNDZ is connected to the central control unit ZST and from the point of view of the multimedia message service center MMNDZ forms the interface or gateway to the receiving telecommunication device ETKG, via which both the retrieval request of the receiving telecommunication device ETKG and the issue of the multimedia message MMN initiated by the central control unit ZST are handled.

The above described description and drawings are only to be considered illustrative of exemplary embodiments, which achieve the features and advantages of the invention. Modifications and substitutions to specific process conditions and structures can be made without departing from the spirit and scope of the invention. Accordingly, the invention is not to be considered as being limited by the foregoing description and drawings, but is only limited by the scope of the appended claims.

The invention claimed is:

1. A method for delivering a multimedia message to a telecommunication device configured as a multimedia message sink, comprising:
   transmitting the multimedia message to a multimedia message service center configured as a multimedia message source for delivering the multimedia message to the telecommunication device;
   storing the multimedia message at the multimedia message service center;
   establishing, directly or indirectly, a traffic channel connection to the telecommunication device;
   sending directly or indirectly, an information message to the telecommunication device by the multimedia message service center informing the telecommunication device about the stored multimedia message, the information message being transmitted via the established traffic channel connection during an information session;
   terminating the information session upon the transmission of the information message; and
   keeping the traffic channel connection established to the telecommunication device at least until the telecommunication device has analyzed the received information message and retrieved the stored multimedia message intended for the telecommunication device from the multimedia message service center via the established traffic channel connection during a fetching session;
   such that both (a) the information message informing the telecommunication device about the stored multimedia message and (b) the multimedia message itself are transmitted to the telecommunication device during the same single traffic channel connection.

2. The method according to claim 1, further comprising sending an indication from the multimedia message service center to the telecommunication device in the information session that the traffic channel connection remains established for a specified time which is sufficient for the analysis of the information message and for the duration of the fetching session.

3. The method according to claim 2, wherein the transmission of the information message takes place with the aid of a special information element of an information element container used for the transmission of the information message or with the aid of a message which is separate from the transmission of the information message.

4. The method according to claim 1, further comprising sending an indication from the telecommunication device to the multimedia message service center in the information session indicating that the traffic channel connection to remain established for a specified time which is sufficient for the analysis of the information message and for the duration of the fetching session.

5. The method according to claim 4, wherein sending comprises exchanging messages between the telecommunication device and the multimedia message service center with a query message sent by the telecommunication device and an acknowledge message sent by the multimedia message service center.

6. The method according to claim 1, wherein the established traffic channel connection is cleared down if the telecommunication device does not intend to start a fetching session at the time when the traffic channel connection is established.

7. The method according to claim 1, wherein the information message is inserted into a short message configured as a short message service message, the short message being sent by order of the multimedia message service center from a short message service center to the telecommunication device.

8. The method according to claim 1, wherein the information message is inserted into a wireless application protocol push message and the wireless application protocol push message is inserted into a short message configured as a short message service message, the short message being sent by order of the multimedia message service center from a short message service center to the telecommunication device.

9. The method according to claim 7, wherein the short message service center is instructed by the multimedia message service center when the information message is sent by the multimedia message service center to the short message service center.

10. The method according to claim 1, wherein the information message is transmitted with the aid of in-band signaling.

11. The method according to claim 10, wherein the in-band signaling uses FSK transmission or DTMF transmission.

12. The method according to claim 1, wherein the information session is carried out according to a modem protocol or a facsimile protocol.

13. The method according to claim 1, wherein the fetching session is carried out according to a TCP/IP protocol, a WSP protocol, a modem protocol or a facsimile protocol.

14. The method according to claim 1, wherein audio, video and/or text data are transmitted with the multimedia message.

15. A telecommunication device for accessing multimedia messages stored in a multimedia message service center, comprising:
   a central control device for controlling the operating and function sequences in the telecommunication device;
   a fetching device for retrieving messages and/or information, said fetching device being coupled to the central control device;
   a transmitter/receiver coupled to the central control device and connected directly or indirectly to the multimedia message service center over a traffic channel connection established by the multimedia message service center, the transmitter/receiver for:
      receiving an information message transmitted directly or indirectly by the multimedia message service center to the telecommunication device during an information session, and
      forwarding the information message to the central control device in order to inform the telecommunication device about a multimedia message stored in a storage location of the multimedia message service center for the said telecommunication device, wherein upon the transmission of the information message the information session is terminated;
   analysis means assigned to the central control device, the analysis means being configured to analyze the information message received by the transmitter/receiver via the traffic channel connection and forwarded to the central control device;
   the fetching device and the central control device together with the analysis means form a function unit which is configured to maintain the traffic channel connection at least until the analysis means has analyzed the received information message and the central control device in accordance with the analyzed information message has retrieved during a fetching session via the fetching device the content of the multimedia message intended for the telecommunication device from the multimedia message service center via the traffic channel connection;

such that the same established traffic channel connection is used for transmitting to the telecommunication device both (a) the information message informing the telecommunication device about the stored multimedia message and (b) the content of the multimedia message.

16. A telecommunication device according to claim 15, wherein the transmitter/receiver, the fetching device and the central control device together with the analysis means are configured to inform the telecommunication device during the information session that the traffic channel connection remains established for a specified time which is sufficient for the analysis of the information message and for the duration of the fetching session, the fetching device is activated immediately by the central control device without establishing a separate traffic channel connection.

17. A telecommunication device according to claim 16, wherein the analysis means is configured to detect and analyze:
   a special information element of an information element container used for the transmission of the information message transmitted by the multimedia message service center together with the information message, or
   a separate message transmitted by the multimedia message service center separately from the information message.

18. A telecommunication device according to claim 15, wherein the transmitter/receiver is configured to inform the multimedia message service center during the information session that the traffic channel connection is required to remain established for a specified time which is sufficient for the analysis of the information message and for the duration of the fetching session.

19. A telecommunication device according to claim 18, wherein the transmitter/receiver is configured for, during an exchange of messages between the telecommunication device and the multimedia message service center:
   sending a query message to the multimedia message service center, and
   receiving an acknowledge message from the multimedia message service center.

20. A telecommunication device according to claim 15, wherein the central control device is configured, with the aid of the transmitter/receiver, to clear down the established traffic channel connection if the telecommunication device does not intend to start a fetching session at the time when the traffic channel connection is established.

21. A telecommunication device according to claim 15, wherein the information message is inserted into a short message configured as a short message service message, and the telecommunication device is connected to a short message service center which, on the instructions of the multimedia message service center, sends the short message to the telecommunication device.

22. A telecommunication device according to claim 15, wherein, the information message is inserted in a wireless application protocol push message, the wireless application protocol push message is inserted into a short message configured as a short message service message, and the telecommunication device is connected to a short message service center which, on the instructions of the multimedia message service center, sends the short message to the telecommunication device.

23. A telecommunication device according to claim 15, wherein the transmitter/receiver is configured to transmit the information message with the aid of in-band signaling.

24. A telecommunication device according to claim 23, wherein the in-band signaling uses FSK transmission or DTMF transmission.

25. A telecommunication device according to claim 15, wherein the transmitter/receiver is configured to carry out the information session according to a modem protocol or a facsimile protocol.

26. A telecommunication device according to claim 15, wherein the fetching device is configured to carry out the fetching session according to a TCP/IP protocol, a WSP protocol, a modem protocol, a PPP protocol or a facsimile protocol.

27. A telecommunication device according to claim 15, wherein the telecommunication device is a fixed-network or mobile-radio device, in particular a cordless mobile handset, a personal computer or a fax machine.

28. A telecommunication device according to claim 15, wherein the multimedia message comprises at least one of: audio, video, and text data.

* * * * *